United States Patent [19]

Sato et al.

[11] Patent Number: 4,793,176
[45] Date of Patent: Dec. 27, 1988

[54] HOT FILM TYPE AIR FLOW METER HAVING A TEMPERATURE SENSING EXOTHERMIC RESISTOR

[75] Inventors: Kanemasa Sato; Sadayasu Ueno, both of Katsuta, Japan

[73] Assignee: Hitachi, Ltd., Tokyo, Japan

[21] Appl. No.: 84,217

[22] Filed: Aug. 12, 1987

[30] Foreign Application Priority Data

Aug. 22, 1986 [JP] Japan .................. 61-195410

[51] Int. Cl.$^4$ .............................. G01F 1/68
[52] U.S. Cl. ................... 73/118.2; 73/204.19
[58] Field of Search .................. 73/118.2, 204

[56] References Cited

U.S. PATENT DOCUMENTS 4,513,615  4/1985  Sato et al. ..................... 73/204
4,562,731  1/1986  Nishimura et al. ............... 73/204

FOREIGN PATENT DOCUMENTS

0116144  8/1984  European Pat. Off. .
0118117  9/1984  European Pat. Off. .

*Primary Examiner*—Herbert Goldstein
*Attorney, Agent, or Firm*—Antonelli, Terry & Wands

[57] ABSTRACT

A resistor main body of a hot film exothermic resistor includes a ceramic body with leads bonded to both end portions thereof, a platinum film body formed on a ceramic body, a spiral trimming groove formed in the platinum film body, and a glass material overcoated on the platinum film body and the ceramic body. The resistor main body projects in the upstream direction of the flow of such that the ratio of a length $l_1$ of the resistor main body to the diameter $d_1$ of the resistor main body is $25 > l_1/d_1 > 14$, and the leads are bent adjacent both end portions. The response speed characteristics, contamination preventing capability and temperature dependency of the hot film exothermic resistor is improved over conventional devices, and the level of noise in the output signal therefrom can be reduced over conventional devices.

8 Claims, 9 Drawing Sheets

HOT FILM TYPE AIR FLOW METER HAVING A TEMPERATURE SENSING EXOTHERMIC RESISTOR

BACKGROUND OF THE INVENTION

1. (Field of the Invention)

The present invention relates to a hot film type air flow meter having a temperature sensing exothermic resistor, and more particularly to a hot film type air flow meter having a high temperature sensing exothermic resistor for measuring a flow rate of the suction air in an internal combustion engine. The hot film type air flow meter having a high temperature sensing exothermic resistor is used to control an internal combustion engine provided with a fuel injector, having high horsepower and low fuel consumption and capable of controlling an exhaust gas with high accuracy and excellent quick response speed characteristics.

2. (Description of the Prior Art)

A conventional hot wire type air flow meter is constructed so that a bobbin-like hot wire forming an exothermic resistor and a bobbin-like cold wire forming a temperature compensating resistor are inserted in a bypass passage as shown in the specification of Japanese Patent Laid-Open No. 104513/1984.

Figure 18:
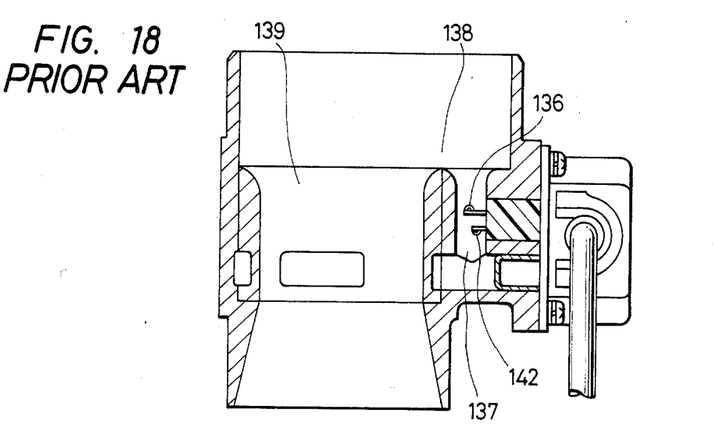
FIG. 18 is a construction diagram of a conventional air flow meter.

As shown in FIG. 18, a prior art hot wire forming an exothermic resistor 136 and a prior art cold wire forming a temperature compensating resistor 142 are disposed in a bypass passage 137, respectively. Since a suitable guide is not provided in a portion 138 at which the flow of the air branches from a main passage 139 into the bypass passage 137, the flow varies delicately. The main passage 139 is made of a metallic material such as die cast aluminum.

The hot wire forming an exothermic resistor 136 has two straight line leads 140a and 140b at both ends thereof. In the conventional method, the leads 140a and 140b are bonded to an alumina pipe to each other and overcoated with a glass material. The hot wire forming an exothermic resistor 136 is formed by winding a thin platinum wire onto a bobbin-like alumina pipe and is overcoated with a glass material.

Figure 19:
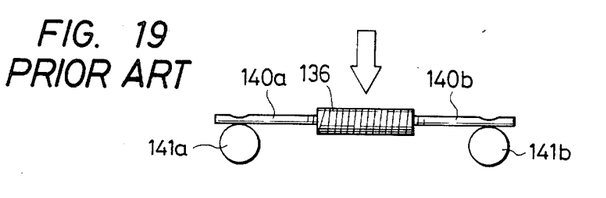
FIG. 19 illustrates the construction and the way of fixing a conventional hot wire form exothermic resistor.

The straight line leads 140a and 140b are disposed along in the lengthwise direction of the exothermic resistor main body and connected to support terminals 141a and 141b, respectively, as shown in FIG. 19. The prior art hot wire forming an exothermic resistor 136 is called a hot wire form constant temperature exothermic resistor or a bobbin-like high temperature sensing exothermic resistor for use in a hot wire type air flow meter in a fuel supply system which is adapted to supply a fuel at a flow rate matching the flow rate of the suction air in the internal combustion engine.

Figure 20:
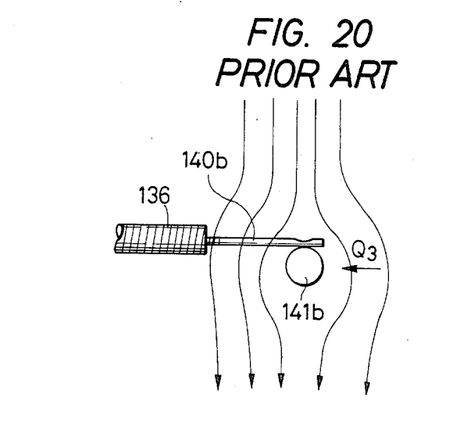
FIG. 20 illustrates the condition of propagation of turbulence of air current around a conventional hot wire form exothermic resistor.
Figure 21:
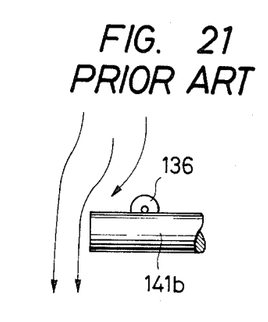
FIG. 21 illustrates the condition of propagation of turbulence of air current around a conventional hot wire form exothermic resistor taken in the direction of an arrow $Q_3$ in FIG. 20.

The diameter of the bypass passage 137 is comparatively large as compared with the dimensions of the exothermic resistor 136 having an outer diameter 0.5 mm, such that the exothermic resistor 136 is apt to receive a surface peeling effect of the air current. The exothermic resistor 136 is positioned close to the support terminals 141a and 141b, and the turbulence of the flow of air is propagated toward the exothermic resistor 136 due to the influence of the viscosity of the air as shown in FIGS. 20 and 21.

As mentioned previously, the shape of a conventional hot wire forming an exothermic resistor 136 is determined on condition that the exothermic resistor 136 is inserted in the bypass passage 137 of a comparatively large diameter of 8-10 mm. Accordingly, the ratio of the outer diameter $d_o$ of the exothermic resistor main body to the length $l_o$ thereof is set to a comparatively low level of $l_o/d_o = 4$.

Figure 22:
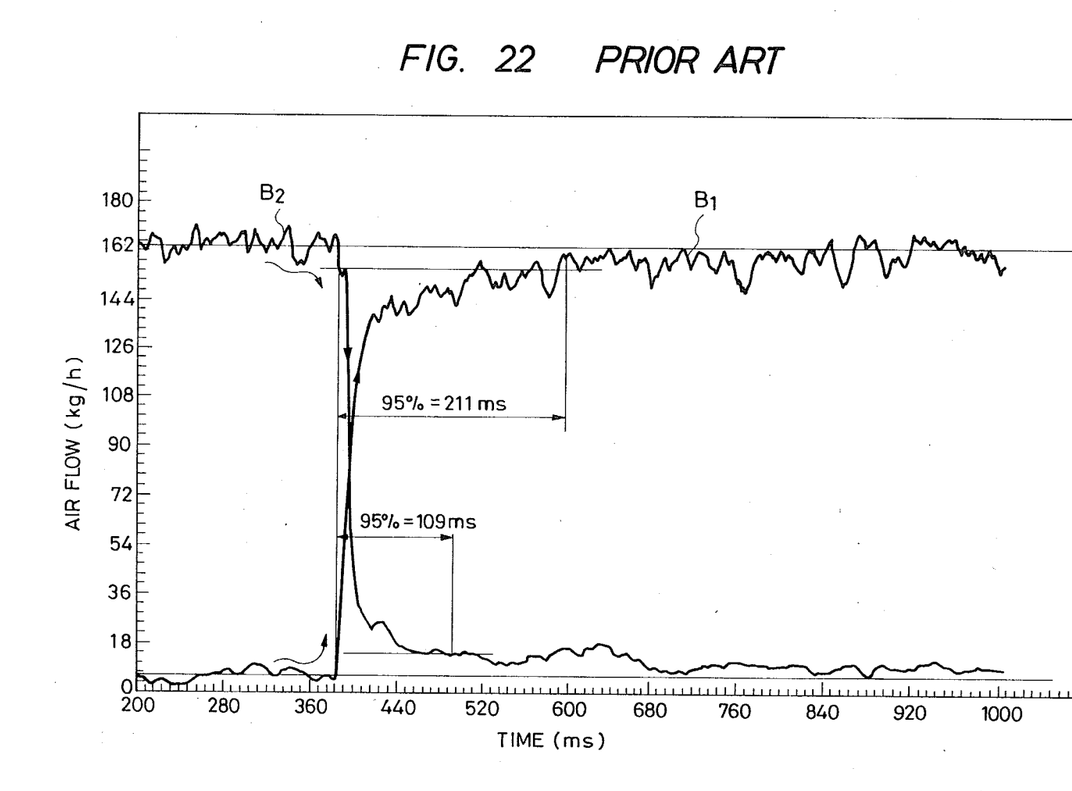
FIG. 22 shows recorded data based on tests and representing an example of the momentary response characteristics of a conventional hot wire form exothermic resistor.

Therefore, the momentary responding capability of the hot wire air type flow meter, which was measured by momentarily charging the flow rate of the air being ejected, by using an electromagnetic valve becomes as in the example shown in FIG. 22. In FIG. 22, the curve line $B_1$ shows the rising response speed characteristics, and the curve line $B_2$ shows the falling response speed characteristics, respectively. Namely, the momentary response time from 5 kg/h to 160 kg/h is 211 msec with respect to the momentary 95% response, and 2 sec (not shown) with respect to the momentary 100% response.

In recent years, demands have been placed on an air flow meter to have high accuracy rather than to serve as a main engine control sensor. To be more exact, it is primarily necessary that the 95% responding capability of the hot wire type air flow meter and the acceleration responding capability thereof during an operation of the engine be improved. Secondly, it is necessary that the variations in the output level with lapse of time, which occur due to the dust deposited on the air flow meter, be minimized. Thirdly, it is necessary to minimize the noise in an output signal of the air flow meter. Fourthly, it is necessary to minimize the temperature dependency of the air flow meter.

A conventional hot wire type air flow meter in which the hot wire forming an exothermic resistor is provided in the bypass passage is characterized in that the occurrence of a so-called binary, i.e. a decrease in the level, which has increased monotonously, of an output from the air flow meter, which decrease occurs when a throttle valve is opened gradually with the number of revolutions per minute of the engine kept constant, can be prevented by the air flow meter alone.

Therefore, this air flow meter is used extensively in practice mainly for 4-cylinder engines. It has become possible to easily prevent the occurrence of a binary by utilizing the data obtained by correcting range of occurrence of a binary stored in a microcomputer in advance. Therefore, it has been urgently demanded that the hot wire type air flow meter be improved with respect to its performance and manufacturing cost.

While an engine in which an air flow meter is provided is controlled by a microcomputer, a slight response delay of the air flow meter adversely affects the operation of the engine, and many complaints are made about the bad operational condition of the engine, especially, in a low speed operational region. Under such circumstances, it has been demanded that the high temperature sensing exothermic resistor in the air flow meter have excellent high speed responding capability.

Specimens of air flow meters having different response speeds were prepared, and the degrees of influence of these response speeds upon the operation of an engine were compared. It was ascertained from the results of the comparison that a 100% rising and falling response speed and a 95% rising and falling response speed were 0.5 sec and not more than 0.1 sec, respectively.

On the other hand, it has been pointed out that variations of the output level with a lapse of time due to dust deposited on the high temperature sensing exothermic resistor are close to the limit of the flow rate variation percentage of $\Delta Q/Q \leq \pm 4\%$ on the target specifications.

A conventional hot wire forming an exothermic resistor is formed by winding a thin platinum wire around a ceramic bobbin, and coating the resultant product with a glass material. Therefore, it is impossible to burn off the deposited dust, and the rate of deposition of earth and impregnated oil from an air cleaner must be minimized.

It is pointed out that an output signal of the air flow meter has a large amount of noise and low accuracy, and it is said that the level of noise must be reduced to less than ½ of the noise in a signal from a currently available air flow meter.

Regarding the temperature dependency of the air flow meter, has been reported that engine troubles occur in a low speed region wherein, for example, a vehicle moves out of its garage in winter after the engine is heated. Accordingly, it is necessary that the temperature dependency of the air flow meter be improved.

SUMMARY OF THE INVENTION

An object of the present invention is to provide a hot film type air flow meter having a temperature sensing exothermic resistor wherein a highly accurate air flow meter is provided.

Another object of the present invention is to provide a hot film type air flow meter having a temperature sensing exothermic resistor wherein the response speed characteristics of the air flow meter are improved.

A further object of the present invention is to provide a hot film type air flow meter having a temperature sensing exothermic resistor wherein contamination preventing capability is improved.

Still further yet an object of the present invention is to provide a hot film type air flow meter having a temperature sensing exothermic resistor wherein a reduced level of noise is obtained.

An even further object of the present invention is to provide a hot film type air flow meter having a temperature sensing exothermic resistor wherein a lower temperature dependency is obtained.

According to the present invention, a hot film type air flow meter having a temperature sensing exothermic resistor in a fuel supply system is adapted to supply a fuel at a flow rate matching the flow rate of the suction air in an internal combustion engine. The temperature sensing exothermic resistor comprises a bobbin-like temperature sensing exothermic resistor main body, and leads extending from both end portions of the exothermic resistor main body. The exothermic resistor main body comprises a ceramic body with the leads bonded to both end portions thereof, a metallic film body formed on an outer circumferential surface of the ceramic body and a glass material overcoated on the ceramic body and the metallic film body.

The exothermic resistor main body of the high temperature sensing exothermic resistor projects toward the upstream side of the air flow so that a ratio of a length $l_1$ of the exothermic resistor main body to a diameter $d_1$ thereof is $25 > l_1/d_1 > 14$, and the leads are bent at both end portions of the exothermic resistor main body.

The exothermic resistor main body of the high temperature sensing exothermic resistor comprises a ceramic body in the form of rod or pipe with the leads bonded to both end portions thereof, a platinum film body formed on an outer circumferential surface of the ceramic body, a spiral trimming groove formed in the platinum film body, and a glass material overcoated on the platinum film body and the ceramic body.

A venturi body is disposed in a main passage of the internal combustion engine, and the support terminal fixing the resin material body of the exothermic resistors is disposed projectingly into the venturi body. The venturi body and the support terminal fixing the resin material body are formed integrally with a resin material.

According to the present invention, in which the hot film form exothermic resistor formed to a thin and elongated structure is set so as to project toward the upstream side of the flow of the air, the response speed characteristics, the contamination preventing capability, the noise suppressing capability and the temperature dependency of the hot film type air flow meter having the temperature sensing exothermic resistor can be improved.

First, the response speed characteristics of the air flow meter will be discussed. In general, a time constant in a case where the flow rate of the air is changed momentarily with a limitless long exothermic cylinder placed in the flow of the air is expressed by the following equation as a function of the diameter d of the cylinder, thermal capacity $C_{P\tau}$ and rate of transfer of heat from the cylinder to the flow of the air.

$$\tau \propto \frac{d_1 \cdot C_{pp}}{h}$$

Accordingly, in order to improve the response speed characteristics, it is necessary to reduce the outer diameter d of the cylinder, increase the heat transfer rate h and reduce the thermal capacity $C_{P\tau}$. The outer diameter $d=0.5$ mm of a conventional hot wire forming an exothermic resistor is reduced to 0.35 mm, and the length $l=2$ mm thereof is increased to 6 mm with the purpose of increasing the surface area and heat transfer rate h of the exothermic resistor.

Since the exothermic resistor used in practice has leads of a limited length fixed to both ends thereof, the outer diameter of the leads are reduced, and the length thereof is increased to as great an extent as possible so as to reduce the rate of transfer of heat from the leads.

A conventional hot wire form exothermic resistor in which a thin metallic wire is no longer used due to its low productivity. Instead, a structure that is obtained by forming a metallic film on the outer circumferential surface of a ceramic bobbin by barrel sputtering utilizing the semiconductor manufacturing techniques, and then forming a spiral trimming groove in the metallic film is employed.

For the purpose of increasing the heat transfer rate h, the ceramic bobbin is elongated to increase the surface area so that the ratio of the surface area of the ceramic bobbin to the unit thermal capacity thereof is increased 1.5 times. The resistance value is reduced to as great an extent as possible, and a flow rate of an electric current is increased to heighten the heating electric power.

Figure 11:
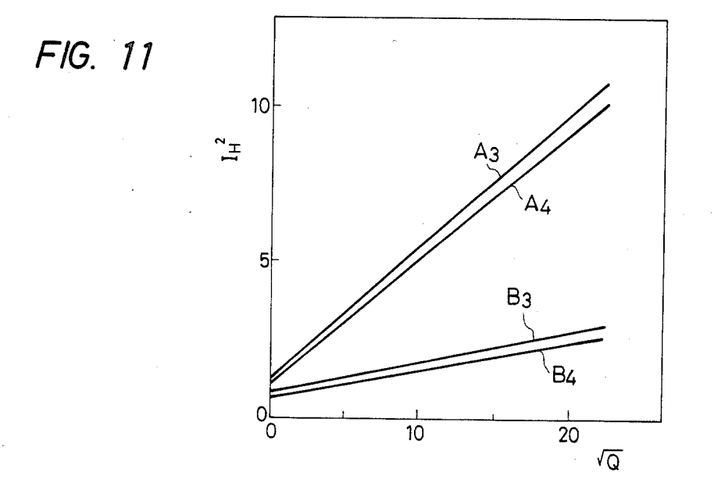
FIG. 11 is graphs showing the heat transfer characteristics of the present invention and the prior art.

As a result, the heat transfer rate of the hot film form exothermic resistor can be increased more than 4 times that of a conventional hot wire form exothermic resistor as shown FIG. 11. In FIG. 11 graphs show the characteristics of the electric current with respect to the flow rate of the air. In FIG. 11, the curve lines $A_3$ and $A_4$ show the characteristics of the electric current with respect to the flow rate of the present invention, and the curve lines $B_3$ and $B_4$ show the characteristics of the electric current with respect to the flow rate of the prior art, respectively.

In order to reduce the rate of transfer of heat to the leads, the length 2 mm of a conventional lead is increased to $l_2=2.5$ mm according to the present invention. The conventional method of bonding the leads and an alumina bobbin to each other with glass material is changed to a method of baking a paste consisting mainly of platinum on the joint portions of the leads and the alumina bobbin.

Figure 10:
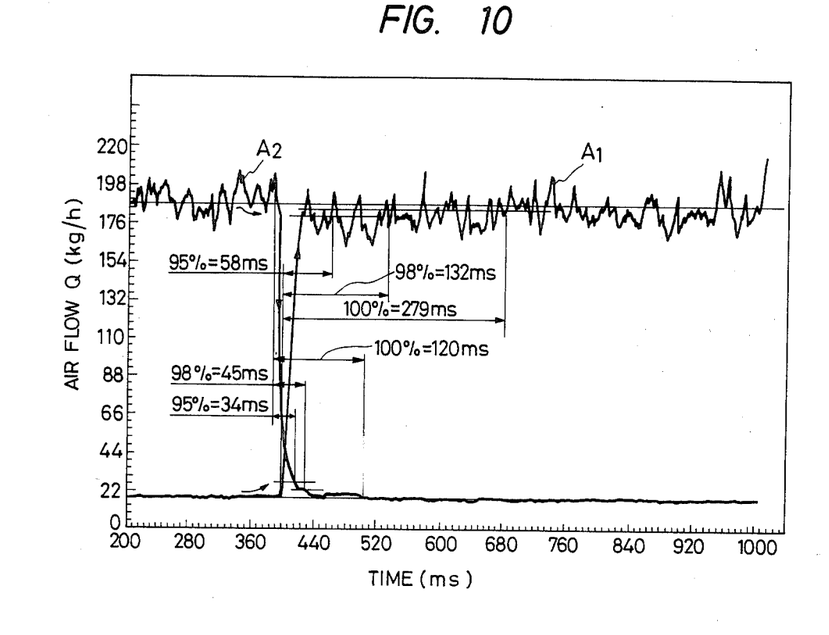
FIG. 10 shows recorded data based on tests and representing an example of the momentary response characteristics of the hot film form exothermic resistor of the present invention.

These reform measures are used practically, so that the response speed characteristics shown in FIG. 22 of a conventional hot wire form exothermic resistor is improved as shown in FIG. 10 which shows the response speed characteristics of the hot film form exothermic resistor according to the present invention. Namely, the rising response speed characteristics of 95% response is about 60 msec, and 100% response 280 msec. Consequently, what are shown in the above-mentioned target specifications can be achieved.

Secondly, the measures used for improving the contamination resistance of the high temperature sensing exothermic resistor will be discussed. A sample on which dust is deposited is washed, and the output characteristics of the resultant sample are measured, these output characteristics are compared with those of the sample measured before it was washed. The results show that the percentage of the portions on which the dust deposited on the ceramic bobbin causes the characteristics to vary is 50%, and the percentage of the portions on which the dust deposited on the leads causes the characteristics to vary is 50%.

Therefore, in order to prevent the contamination of the exothermic resistor, the leads are bent at both ends of and at right angles to the ceramic bobbin, and the exothermic resistor is supported so that the exothermic portion thereof projects toward the upsteam side of the flow of the air with the leads extended in parallel with the flow of the air, these leads being spot-welded to the support terminals. Since the length of the ceramic bobbin is set larger than that of the ceramic bobbin of a conventional exothermic resistor, the temperature distribution in the lengthwise direction of the ceramic bobbin becomes different in that the temperature is lower.

An optimum temperature of the high temperature sensing exothermic resistor is then determined by splashing the earth from the Kanto loam layer or an impregnated oil for the air cleaner element onto the exothermic resistor so as to be deposited thereon, and rating the contamination preventing capability thereof on the basis of the difference between the quantity of the splashed material deposited on a conventional hot wire form exothermic resistor and that of the same material deposited on the hot film form exothermic resistor according to the present invention.

A sample of the hot film form exothermic resistor improved with respect to the above points and a sample of the conventional hot wire form exothermic resistor are arranged in the same passage, and a mixture of the earth from the Kanto loam layer and an impregnated oil for an air cleaner is splashed on the samples from the upstream side, the quantities of the mixture deposited on the samples are then compared.

Figure 12:
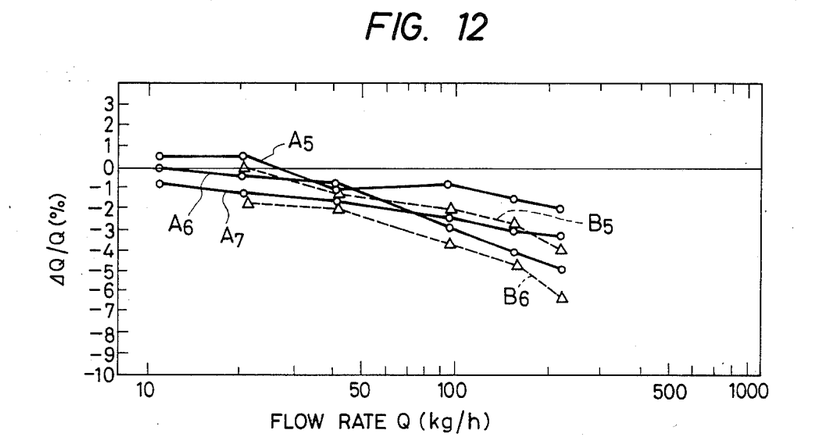
FIG. 12 is graphs showing the contamination preventing capability of the hot film form exothermic resistor of the present invention and the prior art on which earth is splashed at various rates.
Figure 13:
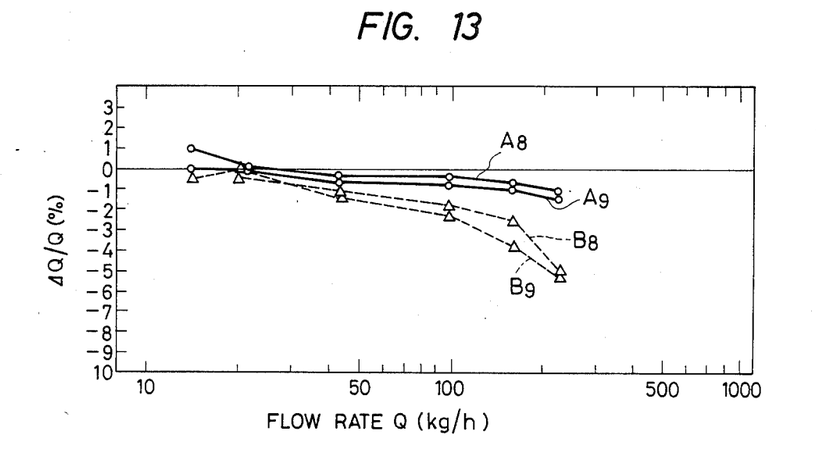
FIG. 13 is graphs showing the contamination preventing capability of the exothermic resistor of the present invention and the prior art on which a mixture of earth and oil is splashed at various rates.

The rates of variation of the output characteristics of the exothermic resistors before and after the tests are shown by flow-rate-converted values $\Delta Q/Q$ in FIGS. 12 and 13. In FIG. 12, the curve lines $A_5$, $A_6$ and $A_7$ show the rates of variation of the output characteristics of the hot film form exothermic resistor of the present invention, and the curve lines $B_5$ and $B_6$ shows the rates of variation of the output characteristics of the hot wire form exothermic resistor of the prior art, respectively. In FIG. 12, the earth from the Kanto loam powder form has an average particle diameter of 5 $\mu$m.

In FIG. 13, the curve lines $A_8$ and $A_9$ show the rates of variation of the output characteristics of the hot film form exothermic resistor of the present invention, and the curve lines $B_8$ and $B_9$ show the rates of variation of the output characteristics of the hot wire form exothermic resistor of the prior art, respectively. In FIG. 13, the mixture of the earth from the Kanto loam powder form having an average particle diameter of 5 $\mu$m and an impregnated oil for an air cleaner is used therein.

In the hot film form exothermic resistor of the present invention, bending the leads so as to prevent the deposition of dust thereon lead to certainly good results, and the variation rate can be reduced by 30–50%.

Thirdly, the reduction of noise in an output signal of the air flow meter will be discussed. A prior art hot wire form exothermic resistor 136 is disposed in the bypass passage 137 as shown in FIG. 18. Since a suitable guide means is not provided in the portion 138 at which a flow of the air branches from a main passage 139 into the bypass passage 137, the flow varies delicately. The diameter of the bypass passage 137 is comparatively large as compared with the dimensions of the hot wire form exothermic resistor 136, the exothermic resistor 136 is apt to receive the surface peeling effect of the air current. The exothermic resistor 136 is positioned close to the support terminals, and the turbulence of the flow of the air is propagated toward the exothermic resistor 136 due to the influence of the viscosity of the air.

Therefore, the bypass passage 137 shown in FIG. 18 and peculiar to the conventional air flow meter is eliminated, and the hot film form exothermic resistor of the present invention is disposed in the main passage. It is ascertained that, since the hot film form exothermic resistor is disposed in the main passage, the noise in an output signal can be reduced by 30%. It is further ascertained that the noise in an output signal can certainly be reduced to not more than ½ as shown in FIG. 14 owing to the employment of the above-mentioned contamination preventing measures, i.e. the employment of a structure in which the leads are bent at right angles with the exothermic resistor main body projected toward the upstream side.

Figure 14:
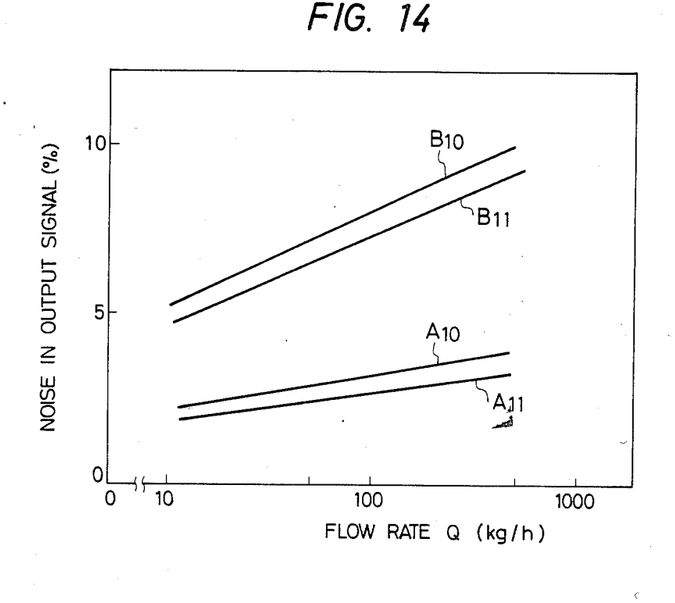
FIG. 14 is graphs comparatively showing the levels of noise in output signals of the exothermic resistor of the present invention and the prior art.

In FIG. 14, the lines $A_{10}$ and $A_{11}$ show the noise in the output signal of the present invention, and the lines $B_{10}$ and $B_{11}$ show the noise in the output signal of the prior art. It is clear that the propagation of the turbulence of the flow of the air, which occurs at the support terminals, can be prevented owing to the change in the way of disposing the hot film form exothermic resistor, wherein the hot film form exothermic resistor is projected toward the upstream side by about 2.5 mm.

Fourthly, the reduction of the temperature dependency will be discussed. In the prior art hot wire form air flow meter, wherein the hot wire form exothermic resistor 136 (Hot Wire; HW) and the cold wire form temperature compensating resistor 142 (Cold Wire; CW) are disposed in the bypass passage 139, the quantities of heat transferred from the chamber to the resistors via the exothermic resistor side terminal and temperature compensating resistor side terminal are not equal, especially, in a low flow rate operation region when the temperature in the chamber is high, for example, 80° C. with the temperature of the flow of the air at a normal level.

For example, when the heat transfer rate on the temperature compensating resistor side is higher than that on the exothermic resistor side, the apparent temperature $T_F$ of the exothermic resistor 136 becomes $T_F > Ta + Th$, and the apparent output level Vo increases to $Vo > \sqrt{(A + B\sqrt{Q})(Ta + Th)}$, wherein Ta is the temperature of the flow of the air; Th a set temperature of the exothermic resistor; A, B constants; and Q a flow rate. For example, the set temperature (Ta) of the exothermic resistor is set higher than 180° C. in comparison with that of the temperature compensating resistor.

Figure 16:
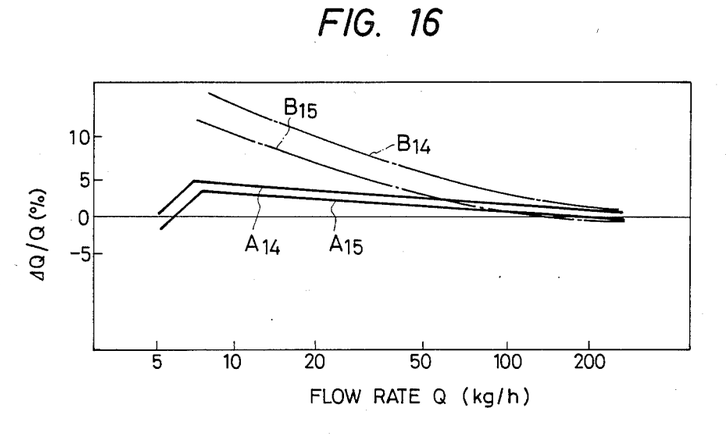
FIG. 16 is a graph showing errors in outputs with respect to the temperature dependency of the exothermic resistor of the present invention and the prior art.

Accordingly, the flow rate variation rate $\Delta Q/Q$ of the hot wire type air flow meter of the prior art increase on the positive side as shown in the curve lines $B_{14}$ and $B_{15}$ of FIG. 16. The large temperature dependency is caused by the following. Since the hot wire form exothermic resistor 136 and the cold wire form temperature compensating resistor 142 are disposed in the small diameter bypass passage 137, the heat transfer rates of the hot wire form exothermic resistor support terminal and the temperature compensating resistor support terminal become unbalanced, and the flow of the air is heated via the wall of the bypass passage 137, so that the temperature of the air increases. It is considered that this phenomena is superposed on one another to cause the variation rate to increase.

Therefore, the bypass passage was eliminated in the present invention, and it was determined that the hot film form exothermic resistor and the cold film form temperature compensating resistor of the present invention are to be disposed in the main passage via a small venturi. The diameter of the passage in the small venturi can be set in the range of 15-25 mm which is larger than the diameter of the bypass passage in which the conventional hot wire form exothermic resistor is disposed. The relay terminals between an electronic circuit and the hot film form exothermic resistor and the cold film form temperature compensating resistor of the present invention are buried in a thin resin portion, and the parts thereof enter the main passage with the small venturi.

These parts are cooled with the air current, so that the temperature thereof can be reduced to a level close to that of the temperature of the air current. As shown in the curve lines $A_{14}$ and $A_{15}$ of FIG. 16, the temperature dependency of an output of the present invention in a case where the temperature of the chamber is varied from normal level to 80° C. can be reduced to $\Delta Q/Q < \pm 4$ in terms of flow rate variation rate.

Fifthly, the reduction of cost of the hot film type air flow meter of the present invention will be discussed. The chamber of the prior art is formed by die casting aluminum but it is changed to a main passage type chamber by eliminating the bypass passage in the present invention. This enables the chamber to be molded integrally by the injection of a resin material. Consequently, the additional step of forming the bypass, in which a conventional hot wire form exothermic resistor is provided, becomes unnecessary.

In the manufacture of the hot film form exothermic resistor, the use of a conventional wire winding step is eliminated. Since a film forming operation of the hot film form exothermic resistor can be carried out by barrel sputtering, which is capable of treating several hundred thousand exothermic resistors at once, the manufacturing cost can be reduced, so that the prime cost of the hot film type air flow meter can be reduced by 10-20%.

The construction of an air flow meter designed for making improvements regarding the above items will be briefly described. In the hot film form exothermic resistor, leads of 0.15 mm in diameter are bonded to an exothermic resistor main body of 0.3-0.4 mm in outer diameter and 4-8 mm in length, each lead being made thinner and longer than the leads of a conventional hot wire form exothermic resistor of this kind. The hot film form exothermic resistor main body is coated with a metallic film which is formed by barrel sputtering, and a spiral groove is formed in the metallic film, the resultant product is then glass-coated.

The leads of the hot film form exothermic resistor are bent at right angles at the ends of the bobbin-like exothermic resistor main body, and the exothermic resistor is fixed to the support terminals by welding so that the exothermic portion thereof projects toward the upstream side. The hot film form exothermic resistor and the cold film form temperature compensating resistor are disposed in a small venturi of 15-25 mm in inner diameter, and the support terminals reach into an electronic circuit-housing portion via the portion molded out of a resin integrally with the small venturi.

Owing to the above-described construction of the hot film type air flow meter according to the present invention, the response speed characteristics, the contamination preventing capability, the capability of suppressing the noise in an output signal and the temperature dependency can be improved.

Figure 17:
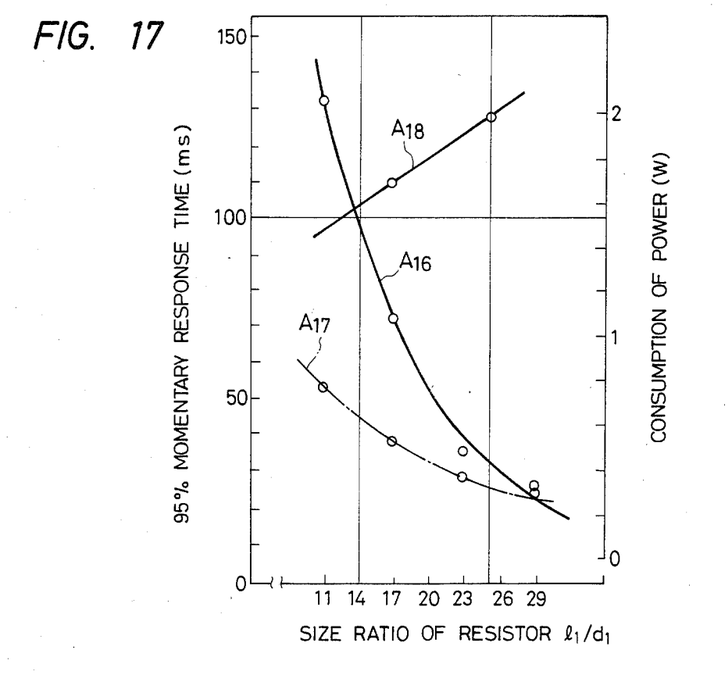
FIG. 17 is a graph showing the relation between the response speed and the consumption of power with respect to the size ratio $l_1/d_1$ of the hot film form exothermic resistor.

An optimum value of the size $l_1/d_1$ of the hot film form exothermic resistor is such that it enables a rising response of not more than 100 msec to be obtained as shown in FIG. 17. Since the consumption of power is set to not more than 2 W, the range of optimum length of the hot film form exothermic resistor of 0.35 mm in outer diameter is $5 < l_1 < 7.5$, and $l_1/d_1$ is $25 > l_1/d_1 > 14$.

DETAILED DESCRIPTION OF THE INVENTION

One embodiment of the present invention in which the above knowledge is practically utilized will now be described.

Figure 6:
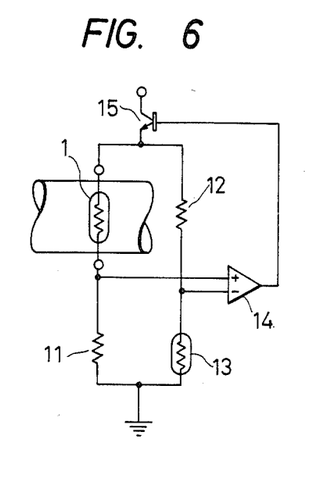
FIG. 6 is a circuit diagram of the hot film type air flow meter.
Figure 7:
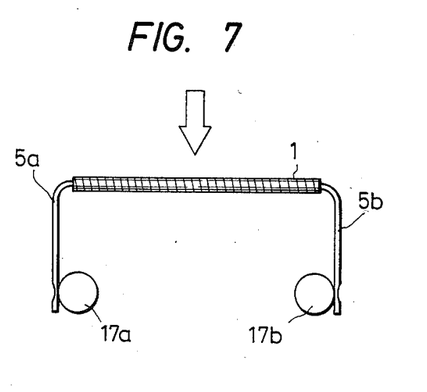
FIG. 7 illustrates the construction diagram and the way of fixing the hot film form exothermic resistor of the present invention.
Figure 8:
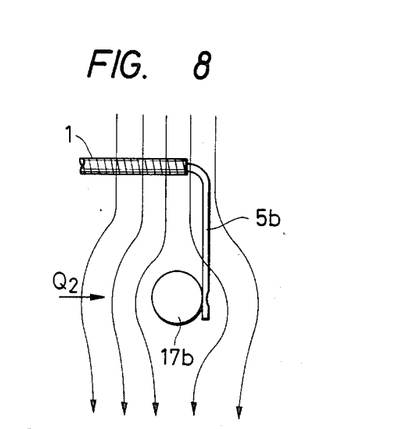
FIG. 8 illustrates the condition of propagation of turbulence of air current around the hot film form exothermic resistor of the present invention.
Figure 9:
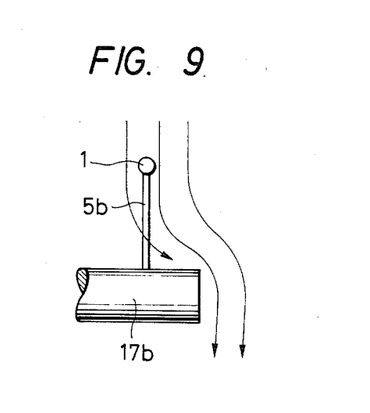
FIG. 9 illustrates the condition of propagation of turbulence of air current around the hot film form exothermic resistor of the present invention taken in the direction of an arrow $Q_2$ in FIG. 8.

A hot film form exothermic resistor (Hot Film (HF)) or a bobbin-like high temperature sensing resistor 1 forms a bridge with other resistors 11, 12 and a cold film form temperature compensating resistor (Cold Film (CF)) or a bobbin-like temperature compensating resistor 13 as shown in FIG. 6. A differential voltage of this bridge resistor is differentially amplified through an amplifier 14 to form a feedback circuit for driving a transistor 15. The hot film form exthermic resistor 1 and the temperature compensating resistor 13 are spot-welded to the two corresponding support terminals 17a, 17b and 18a, 18b, respectively and these resistors 1 and 13 are thereby fixedly supported thereon. The temperature of the hot film form exthermic resistor 1 is controlled so that a difference between this temperature and the temperature of the air current detected by the temperature compensating resistor 13 is in a constant level of, for example, 180° C.

Figure 4:
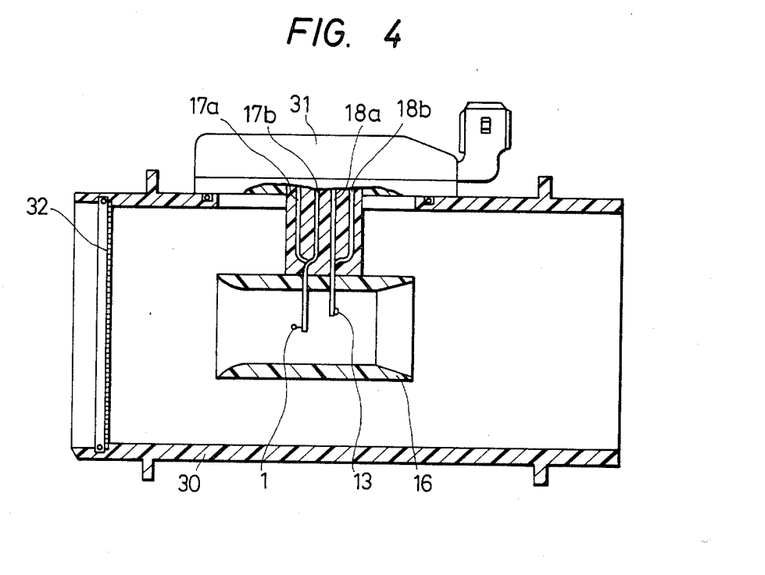
FIG. 4 is a cross-sectional construction diagram of the duct in which the small venturi has the hot film type air flow meter according to the one embodiment of the present invention.
Figure 5:
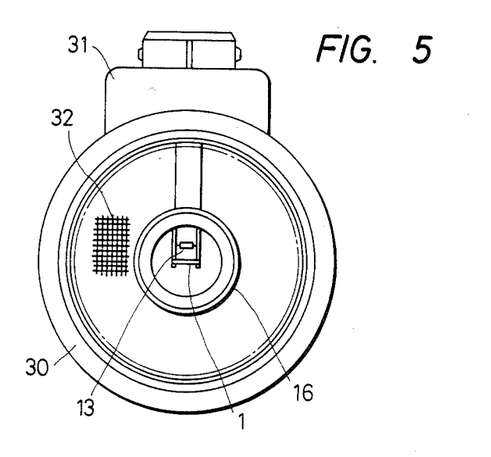
FIG. 5 is a front construction diagram of the duct in which the small venturi has the hot film type air flow meter according to the one embodiment of the present invention.

As shown in FIGS. 4 and 5 the driving circuit is held in a housing 31 combined with a duct or a main passage 30, and leads 5a, 5b (shown in FIG. 1) of the hot film form exothermic resistor 1 and leads of the temperature compensating resistor 13 are spot-welded to the support terminals 17a, 17b and 18a, 18b buried in a resin material. The support terminals 17a, 17b and 18a, 18b are projected into a small venturi 16. The small venturi 16 made of a plastic resin material is disposed in the central portion of a passage in the duct 30 made of a plastic resin material, and the hot film form exothermic resistor 1 and the temperature compensating resistor 13 are disposed on the upstream side of the flow of the air and downstream side of the flow of the air, respectively. A current setting metal net 32 is set in an upstream portion of the duct 30.

The hot film form exothermic resistor or the bobbin-like high temperature sensing resistor 1 for a constant temperature hot film type air flow meter in a fuel supply system is adapted to supply a fuel at a flow rate matching the flow rate of the suction air in an internal combustion engine.

Figures 1, 2:
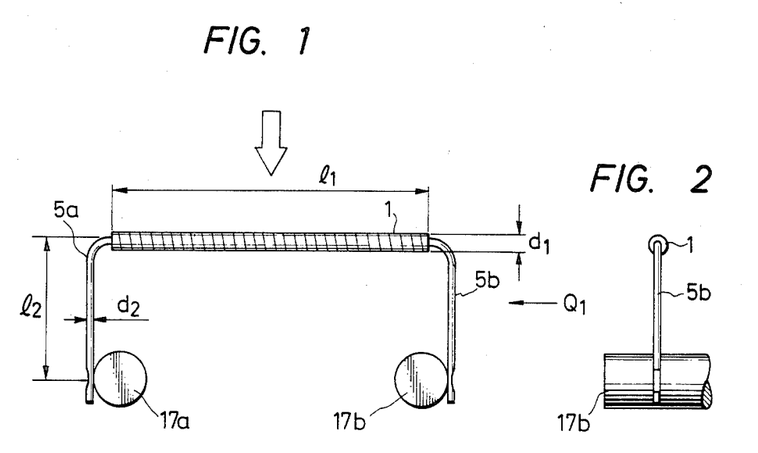
FIG. 1 is a construction diagram of the hot film form exothermic resistor in properly fixed state according to the one embodiment of the present invention.
FIG. 2 is a side elevation view taken in the direction of an arrow $Q_1$ in FIG. 1.
Figure 3:
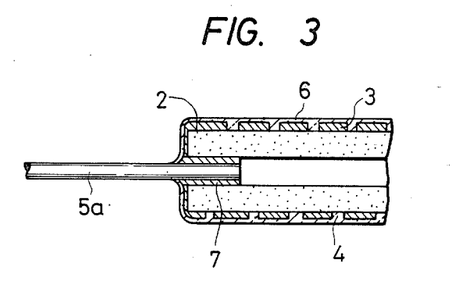
FIG. 3 is a cross-sectional view of the hot film form exothermic resistor.

The leads 5a and 5b shown in FIGS. 1 and 3 in the hot film form exthermic resistor 1 are fixed to both ends of an alumina pipe or a cermamic bobbin 2 of 0.35 mm in outer diameter ($d_1$) and 6 mm in length ($l_1$) by applying frit-containing paste 7 consisting mainly of a noble metal to the joint portions, and then baking the paste 7. A thin platinum film 3 is formed to a thickness of 1–3 μm by barrel sputtering on the outer circumferential surface of the alumina bobbin 2, and the resultant product is heat treated and then resistance-trimmed with a laser beam. A trimming groove 4 is formed at a constant pitch from one end of the alumina bobbin 2 to the other.

An initial resistance value is measured in advance, and the relation between this value and the number of the trimming grooves 4 is determined after the trimming operation. If the trimming operation is carried out after the number of the trimming grooves 4 has been determined on the basis of the initial resistance value by using a computer, the scatter of the resistance value after the trimming operation becomes within $<\pm 3\%$.

The exothermic portion of the hot film form exothermic resistor 1 is covered with a layer of a glass material 6 of 5–10 μm in thickness. The leads 5a and 5b having the outer diameter ($d_2$) at both ends of the hot film form exothermic resistor 1 are bent at both ends of the alumina bobbin 2 with a radius of 0.3–0.5 mm so as to extend at right angles to the axis of the alumina bobbin 2 as shown in FIG. 1, and they are spot-welded at the portions thereof which are 2.5 mm in length ($l_2$) away from the axis of the alumina bobbin 2 to the support terminals 17a and 17b, in such a manner that the exothermic portion of the hot film form exothermic resistor 1 projects toward the upstream side.

The length ($l_2$) of each lead 5a and 5b of the hot film form exothermic resistor 1 of 2.5 mm is determined after making sure that each lead 5a and 5b was not broken when it was subjected to a vibration resistance test which is conducted at a frequency of 10–3 kHz and a maximum vibration acceleration of 60 G with the time of sweep reciprocation of 4 minutes for 4 hours along each of the X, Y and Z axes. If the length ($l_2$) of each lead 5a and 5b is reduced, the vibration resistance thereof decreases. The response speed increases up to $l_2/d_2=17$ but it does not vary even when $l_2/d_2$ exceeds 17.

To this embodiment of the present invention, the temperature compensating resistor (Cold Film (CF)) 13, which is a cold film form temperature compensating resistor or a bobbin-like low temperature compensating resistor, is made by same manufacturing method of the hot film form exothermic resistor 1 so as to have the substantially same coefficient of temperature.

The temperature compensating resistor 13 comprises a bobbin-like temperature compensating resistor main body, and leads extending from both end portions of the temperature compensating resistor main body. The temperature compensating resistor main body comprises a ceramic body with the leads bonded to both end portions thereof, a platinum film body formed on an outer circumferential surface of the ceramic body and a glass material overcoated on the ceramic body and the platinum film body.

In general, an air flow meter combined with a multipoint fuel injection control system is fixed to a chassis in many cases, and it can be used sufficiently if it can withstand a vibration acceleration of 10 G. When an air flow meter in the form of a throttle body assembly in which the air flow meter is incorporated in the throttle body is set mainly in a single point fuel injection control system, the air flow meter is connected directly to the suction manifold in most cases. In such a case, it is necessary that the air flow meter stands a vibration acceleration of 60 G at highest.

Figure 15:
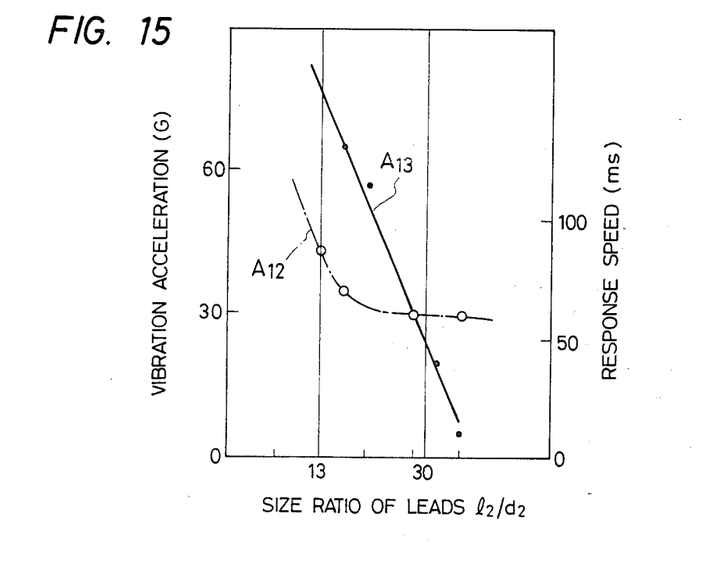
FIG. 15 is graphs showing the vibration acceleration and the response speed with respect to the size ratio $l_2/d_2$ of leads of the present invention.

Accordingly, as shown in FIG. 15, the range of use of $l_2/d_2$ of the leads 5a and 5b of the hot film form exothermic resistor 1 is $13 < l_2/d_2 < 30$. In one embodiment of the present invention, the outer diameter ($d_1$) of the hot film form exothermic resistor 1 is reduced, and the length ($l_1$) thereof is increased three times, as compared with those of a conventional hot wire form exothermic resistor of this kind. As a result, the ratio of the surface area of the hot film form exothermic resistor 1 to the unit thermal capacity thereof can be increase 1.5 times.

Since the resistance value is with the level of the heating current increased to heighten the heating electric power, the momentary response characteristics can be improved, i.e., the momentary 95% response speed characteristics and the momentary 100% response speed characteristics can be improved to not more than 100 msec and not more than 300 msec, respectively. Therefore, the acceleration respnse characteristics of the hot film form air flow meter during a practical operation of the vehicle can be improved.

The contamination preventing capability of the hot film form exothermic resistor 1 of the present invention can also be improved. Since the leads 5a and 5b of the hot film form exothermic resistor 1 are bent at the side ends of the exothermic resistor main body at right angles thereto and disposed in parallel with the direction of the air current, the rate of deposition of dust on the leads 5a and 5b decreased greatly, and the flow rate variation rate before and after a dust deposition test can be reduced by 30–50% as compared with that in a case where a conventional hot wire form exothermic resistor is used.

The level of noise in an output signal the hot film form air flow meter can also be reduced by eliminating the disposition of the hot film for exothermic resistor 1 in the small diameter bypass passage, and inserting the small venturi 16 of 15–25 mm in diameter in the central portion of the interior of the main passage. This enables the air current on the upstream side to be set properly in the small venturi 16.

Since the inner diameter of the small venturi 16 is increased 2.5 times that of the bypass passage referred to above, the hot film form exothermic resistor 1 substantially stops receiving the influence of the passage wall surface peeling current. The leads 5a and 5b of the hot film form exothermic resistor 1 are bent, and the exothermic portion of the hot film form exothermic resistor 1 is projected toward the upstream side, so that the turbulence occurring around the support terminals 17a, 17b and 18a, 18b is rarely propagated to the hot film form exothermic resistor 1. Consequently, the level of noise in an output signal of the hot film form exoethermic resistor 1 can be reduced to not more than ½ of that of the noise in an output signal from a conventional hot wire form exothermic resistor.

The temperature dependency of the hot film form exothermic resistor 1 can also be improved. The disposition of the exothermic resistor 1 and the temperature compensating resistor 13 in the bypass passage is eliminated, and they are arranged in the central portion of the interior of the small venturi 16. As a result, the buried portions of the terminals are positioned in the air current and cooled therewith, so that the temperature of these portions become close to that of the air current.

Since the inner diameter of the small venturi 16 in which the hot film form exothermic resistor 1 and the temperature compensating resistor 13 are disposed is 2.5 times as large as that of the bypass passage in a conventional duct of the hot wire type air flow meter, the air current comes to receive substantially no temperature increasing influence of the heat from the wall surface. This enables the error of the temperature dependency on the side of a low flow rate to be reduced to about ½ of that in prior art hot wire form exothermic resistors.

The reduction of the manufacturing cost of the hot film type air flow meter of the present invention can also be attained. A conventional chamber is formed by die casting aluminum. However, the employment of a bypass passage is eliminated, and a main passage type duct 30 is formed, so that the duct 30 becomes possible to be molded integrally out of a resin material. Therefore, an additional processing step, such as the step of forming a bypass passage in a conventional chamber becomes unnecessary.

In the hot film form exothermic resistor 1 according to the present invention, the step of winding a metallic wire around a bobbin-like exothermic resistor main body is eliminated, and the steps of forming the thin metallic film 3 on the bobbin-like exothermic resistor main body by barrel sputtering, and subjecting the resultant product to laser trimming are employed. This enables the reduction of manufacturing costs. Therefore, the primary cost of the hot film type air flow meter of the present invention can be reduced by 10–20%.

According to the one embodiment of the hot film type air flow meter of the present invention, in which the hot film form exothermic resistor is elongated and disposed in a main passage as it is supported so as to project toward the upstream side, the response speed characteristics, the contamination preventing capability and the temperature dependency of the hot film form exothermic resistor can be improved, and the level of noise in an output signal therefrom can be reduced. Thus, the performance of the hot film form exothermic resistor can be greatly improved.

We claim:

1. A hot film type air flow meter having a temperature sensing exothermic resistor in a fuel supply system which supplies fuel at a flow rate matching the flow rate of air sucked into an internal combustion engine, wherein said air flows in a single direction, said temperature sensing exothermic resistor comprising:

a bobbin-shaped temperature sensing exothermic resistor main body having a length $l_1$ and a diameter $d_1$, and leads extending from both end portions of said exothermic resistor main body, wherein said exothermic resistor main body includes a ceramic body with said leads bonded to both end portions thereof, a metallic film body formed on an outer circumferential surface of said ceramic body and a glass material overcoated on said ceramic body and said metallic film body, and said exothermic resistor main body projects upstream into the flow of air such that a ratio of said length $l_1$ of said exothermic resistor main body to said diameter $d_1$ of said exothermic resistor main body is $25 > l_1/d_1 > 14$, and said leads are bent adjacent both end portions of said exothermic resistor main body.

2. A hot film type air flow meter having a temperature sensing exothermic resistor (1) according to claim 1, wherein said exothermic resistor main body further comprises a ceramic body with said leads bonded to both end portions thereof, a platinum film body formed on an outer circumferential surface of said ceramic body, a spiral trimming groove formed in said platinum film body, and a glass material overcoated on said platinum film body and said ceramic body.

3. A hot film type air flow meter having a temperature sensing exothermic resistor according to claim 1, wherein said leads are supported by two spaced apart support terminals, said support terminals are fixed in a resin material body which is provided at a main passage of said internal combustion engine, said exothermic resistor main body projects in the upstream direction of the flow of said air from said support terminals, and said length $l_1$ of said exothermic resistor main body is substantially equal to a distance between said two spaced apart support terminals, and said leads are parallel to the flow of said air.

4. A hot film type air flow meter having a temperature sensing exothermic resistor and a temperature compensating resistor in a fuel supply system which supplies fuel at a flow rate matching the flow rate of air sucked into an internal combustion engine, said temperature sensing exothermic resistor being disposed in the upstream direction of the flow of said air and said temperature compensating resistor being disposed in the downstream direction of the flow of said air, said hot film type air flow meter comprising:

said temperature sensing exothermic resistor including a first bobbin shaped temperature sensing exothermic resistor main body having a length of $l_1$ and a diameter $d_1$, and first leads extending from both end portions of said temperature sensing exothermic resistor main body, said temperature sensing exothermic resistor main body including a first ceramic body having said first leads bonded to both end portions thereof, a first metallic film body formed on an outer circumferential surface of said ceramic body and a first glass material overcoated on said first ceramic body and said first metallic film body, said temperature compensating resistor includes a second bobbin shaped temperature compensating resistor main body, second leads extending from both end portions of said temperature compensating resistor main body, said temperature compensating resistor main body includes a second ceramic body having said second leads bonded to both end portions thereof, a second metallic film body formed on an outer circumferential surface of said second ceramic body and a second glass material overcoated on said second ceramic body and said metallic film body and wherein said temperature sensing exothermic resistor main body projects in the upstream direction of the flow of said air such that a ratio of said length $l_1$ of said temperature sensing exothermic resistor main body to said diameter $d_1$ thereof is $25 > l_1/d_2 > 14$, and said first leads are bent adjacent both end portions of said temperature sensing exothermic resistor main body.

5. A hot film type air flow meter having a temperature sensing exothermic resistor and a temperature compensating resitor according to claim 4, wherein said temperature sensing exothermic resistor main body further comprises a first ceramic body with said first leads bonded to both end portions thereof, a first platinum film body formed on an outer circumferential surface of said first ceramic body, a first spiral trimming groove formed in said first platinum film body, and a first glass material overcoated on said first ceramic body and said first platinum film body, and wherein said temperature compensating resistor main body further comprises a second ceramic body with said second leads bonded to both end portions thereof, a second platinum film body formed on an outer circumferential surface of said second ceramic body, a second spiral trimming groove formed in said second platinum film body, and a second glass material overcoated on said second ceramic body and said second platinum film body.

6. A hot film type air flow meter having a temperature sensing exothermic resistor and a temperature compensating resistor in a fuel supply system which supplies fuel at a flow rate matching the flow rate of air sucked into an internal combustion engine wherein said air flows in a single direction, and said temperature sensing exothermic resistor being disposed in the upstream direction of the flow of said air and said temperature compensating resistor being disposed in the downstream direction of the flow of said air, said hot film type air flow meter comprising:

said temperature sensing exothermic resistor including a bobbin shaped temperature sensing exothermic resistor main body having a length $l_1$ and a diameter $d_1$, and first leads extending from both end portions of said temperature sensing exothermic resistor main body, said temperature sensing exothermic resistor main body includes a first ceramic body having said first leads bonded to both end portions thereof, a first metallic film body formed on an outer circumferential surface of said first ceramic body and a first glass material overcoated on said first ceramic body and said first metallic film body;

said temperature compensating resistor includes a bobbin shaped temperature compensating resistor main body, second leads extending from both end portions of said second exothermic resistor main body, said temperature compensating resistor main body includes a second ceramic body having said second leads bonded to both end portions thereon, a second metallic film body formed on body and a second glass material overcoated on said second ceramic body and said second metallic film body; wherein said first leads are supported by a first support terminal, said second leads are supported by a second support terminal, and said first support terminal and said second support terminal being fixed in a resin material body;

wherein said temperature sensing exothermic resistor main body projects in the upstream direction of the flow of air such that a ratio of said length $l_1$ of said temperature sensing exothermic resistor main body to said diameter $d_1$ of said temperature sensing exothermic resistor main body is $25 > l_1/d^1 > 14$, and said first leads are bent adjacent both end portions of said temperature sensing exothermic resistor main body; and wherein a venturi body is disposed in a main passage of said internal combustion engine, and said first and second support terminals fixed in said resin material body are disposed in said venturi body.

7. A hot film type air flow meter having a temperature sensing exothermic resistor and a temperature compensating resistor according to claim 6, wherein said venturi body and said first and second support terminals fixed in said resin material body are formed integrally with a resin material.

8. A hot film type air flow meter having a temperature sensing exothermic resistor and a temperature compensating resistor according to claim 6, wherein said leads bonded to said resistor main body are bent at right angles to said first ceramic body and projects about 2.5 mm in the upstream direction of the flow of said air.

* * * * *